Figure 1:
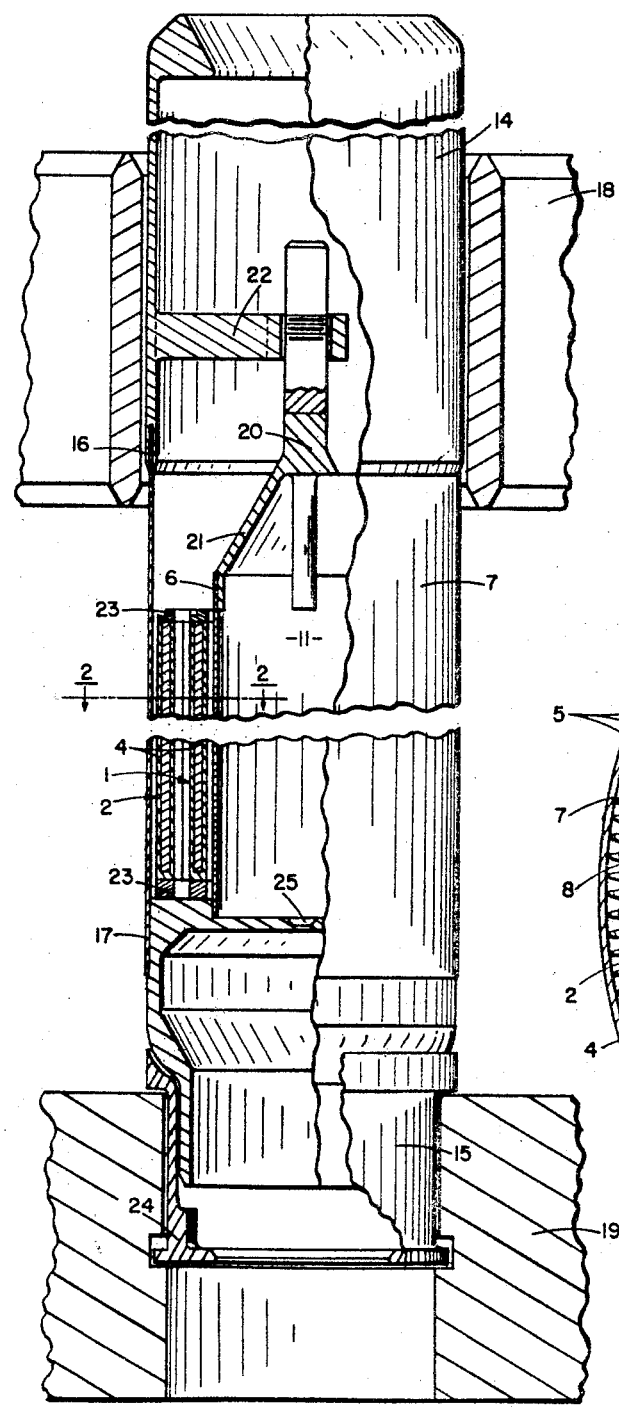

Aug. 16, 1960 C. W. WHEELOCK 2,949,416
CONCENTRIC TUBULAR FUEL ELEMENT
Filed Jan. 14, 1959 2 Sheets-Sheet 1

*INVENTOR.*
CLIFFORD W. WHEELOCK
BY Gerald G. Koris
ATTORNEY

INVENTOR.
CLIFFORD W. WHEELOCK

United States Patent Office 2,949,416
Patented Aug. 16, 1960

2,949,416

CONCENTRIC TUBULAR FUEL ELEMENT

Clifford Warren Wheelock, Canoga Park, Calif., assignor, by mesne assignments, to the United States of America as represented by the United States Atomic Energy Commission Filed Jan. 14, 1959, Ser. No. 786,893

5 Claims. (Cl. 204—193.2)

My invention relates to an improved fuel element for a nuclear reactor, and more particularly to a fuel element for an organic moderated reactor of improved performance.

For a detailed description of an organic moderated reactor, reference is made to Reports NAA-SR-1700, 1800, and 1850, available from the Office of Techanical Services, Washington 25, D.C.

Heretofore, plate or MTR-type fuel elements have been employed in organic moderated reactors, as well as in light and heavy water cooled reactors. For instance, the Orangic Moderated Reactor Experiment reactor (OMRE), described in the above reports, employs such an element. Basically, this element comprises a plurality of parallel, flat or slightly curved plates held together in a rectangular frame. Coolant flow is of the parallel flow-type; that is, parallel to the fuel plates along the longitudinal axis of the element. For information concerning the MTR-type fuel element and its method of frabrication, attention is invited to the paper of J. E. Cunningham and E. J. Boyle, entitled "MTR-type Fuel Elements," appearing in "The Proceedings of the International Conference on the Peaceful Uses of Atomic Energy," Geneva, Switzerland, August 1955; available for sale from the United Nation's Book Store, New York, N.Y.

While the plate-type element is operable and generally satisfactory, a number of disadvantages have become apparent, and which desirably call for improvement. It should be appreciated, by way of preface, that the fuel element is probably the single most important feature of a nuclear reactor from the standpoints of technical feasibility, and economics of nuclear power generation. The reactor is frequently designed about the fuel element in terms of its core configuration, mechanical assembly, flow rates, and operating conditions, just to mention a few. From the economics standpoint, fuel costs account for roughly half of the total cost of power generation from nuclear reactors, and any improvement in the fuel element to achieve higher operating temperatures, better flux and power distribution, and longer fuel element life, would contribute very significantly to reducing fuel cycle costs.

Among the disadvantages of the plate-type element is a rather high maximum-to-average flux in the fuel element. This arises from a flux drop across the element due to self shielding of one fuel plate by others; the inner plates, which "see" a lower neutron flux, because of absorption of neutrons by the outer plates, will generate less heat. Since the maximum permissible temperature, and hence power level, of the fuel element is limited by the temperature of the hottest portion of the element, the power output is reduced over what could be obtained with uniform flux and temperature level. Another result is non-uniform fuel burnup, which limits the life of the fuel element before reprocessing; burnup is limited by the maximum permissible burnup of the individual fuel plate which has received the greatest irradiation, rather than by the average burnup. Furthermore, the coolant flow rate is relatively high with the plate-type element for the extraction of a given amount of heat and this in turn increases pumping power demands and costs. The rectangular plate-type element also requires angular orientation in the reactor, which complicates the fuel handling equipment for charging and discharging the fuel. Because the heat generation and temperature distribution in the rectangular plate-type element is non-uniform, stresses are introduced which may lead to fuel element failure.

An object of my present invention, therefore, is to provide an improved fuel element for a nuclear reactor.

Another object of my invention is to provide a fuel element for a nuclear reactor of improved performance characteristics and simplified manufacture.

Another object is to provide such a fuel element which has relatively uniform heat generation and temperature distribution.

Another object is to provide such a fuel element wherein moderator is better divided between regions inside and outside the fuel element, thereby leading to more uniform thermal neutron flux levels.

Still another object is to provide such a fuel element which is highly suited to use different fuel and structural materials.

Still another object is to provide such a fuel element wherein control rods may be employed in the central region thereof, thereby not perturbing neutron flux in adjacent fuel elements.

Yet another object is to provide a fuel element which does not require angular orientation in a reactor.

The above and other objects and advantages of my invention will become apparent from the following detailed description, taken together with the attached claims and accompanying drawings. In the drawings, Figure 1 is an elevation view, partly in section, showing the fuel element in position in a nuclear reactor, Figure 2 is a partial cross section through Figure 1 and Figure 3 is a perspective view of the element.

Basically, my fuel element comprises a plurality of concentric rings containing the fissionable material. The assembly of fuel rings is held together by inner and outer concentric container tubes. Moderator flows through the inner of the container tubes, and thus moderator material is better divided between the regions inside and outside the fuel element. The thermal neutron flux level on the inside of the fuel element is consequently essentially the same as that on the outside. The fuel element is adapted to the use of control rods or other control media in the central region of any or all fuel elements in the reactor. A convenient method is consequently obtained for controlling power of every fuel element without introducing localized flux perturbations in adjacent fuel elements. Control may also be achieved by removing moderator rather than by introducing poison, thereby leading to more efficient utilization of neutrons. The element, being preferably circular in cross section, does not require angular orientation, which simplifies design of fuel handling equipment, simplifies manufacture of the element, reduces stresses, and greatly increases uniformity of heat generation and temperature distribution. Because of the more uniform heat distribution in the element, the required reactor power is attained with lower coolant flow rate, lower pumping power, fewer fuel elements, and of great importance, more uniform fuel burnup is achieved. The result of such improvements is lower fuel cycle costs in nuclear power generation.

Figure 2:
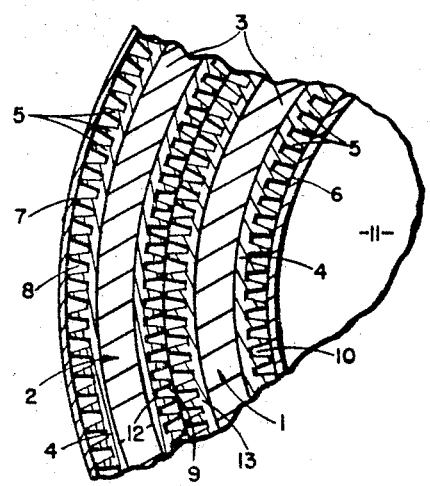

Turning now to Figure 2, the fuel in the element is in the form of two concentric fuel rings 1 and 2, having a central core 3 of fissionable material and a cladding 4 with fins 5. The fins provide increased surface area for heat transfer. Inner and outer tubes 6 and 7 contain the two concentric fuel rings. Three annular channels are thereby formed for coolant flow, between the outer tube and outer fuel ring 8, between the fuel rings 9, and between the inner fuel ring and inner container ring 10. The moderator flows through the interior of the inner container tube at 11, thus contributing to equal moderator distribution, and hence to flatter flux and temperature distribution. In place of a circulating moderator such as water or hydrocarbon, a fixed solid moderator may be employed. Examples are beryllium metal or oxide, and preferably a metal hydride of low cross section and high hydrogen density, such as zirconium hydride.

Figure 3:
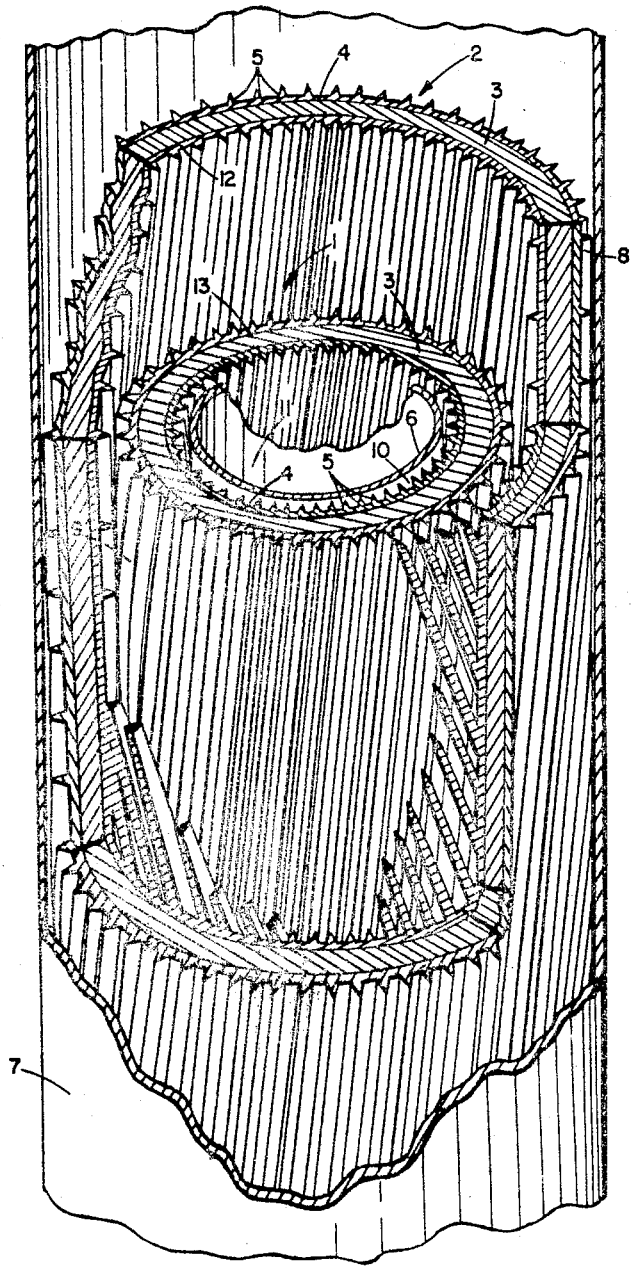

It is seen in view in Figure 3 that the fins 5 on both surfaces of each fuel ring are twisted in a slight spiral along their longitudinal axis; a typical twist is approximately 10°–60° per foot of length, with about 30° being preferred. This produces a helical flow of coolant through the element which compensates for any hot-channel effects caused by variations in heat generation from angular flux variation around the fuel tube, produces a longer coolant residence time in the element, and greater volumetric heat transfer. In addition, the twist of the fins of the inner cladding 12 of external fuel ring 2 and the outer cladding 13 of inner fuel ring 1 are in opposite directions so that the fins cross and contact one another at a slight angle, thereby maintaining concentricity of the tubes and providing additional support and spacing.

As seen in Figure 1, the upper and lower ends of outer tube 7 are securely fastened by welding or brazing to the upper and lower grid plugs or fixtures 14 and 15 of the fuel element at points 16 and 17; the support fixtures are typical, and may vary with core structural configuration. The rectangular upper grid plug 14 fits into the upper grid plate 18 of the reactor and is designed to facilitate fuel handling operations. The lower grid plug 15 fits into the lower grid plate 19 where it supports the weight of the fuel element. The inner container tube 6 meets a tube alignment structure 20 at its guide webbing portion 21. The tube alignment structure in turn engages the tap head guide web 22 of plug 14. The longitudinal ends of fuel rings 1 and 2 are covered with end cladding plugs 23. A flow-regulating orifice 24, of varying diameter, may be installed, depending upon particular reactor design considerations, at the lower end of fuel elements to reduce the over-all flow of coolant through the core or to limit the flow through the outer regions of the core where heat generation commonly drops due to radial flux drop. Another orifice 25 may be used as an internal moderator control. Coolant flow is downward through the element in this application, but is equally adaptable to upward flow.

The fuel ring core may satisfactorily comprise any form of fissionable uranium or plutonium, such as the metal, alloys, or ceramic compositions, and "fuel" or "fissionable material" as used herein is intended to have such meaning. Non-limiting examples are uranium or plutonium metal, thorium-uranium alloy, thoria-urania, uranium dioxide, refractory ceramic compositions such as uranium carbide and nitride, and alloys such as uranium-molybdenum.

The cladding material for the fuel rings and the container tubes may likewise be satisfactorily chosen from a number of metals and alloys, preferably, but not necessarily, having a relatively low thermal neutron absorption cross section. The use of a particular one is not critical, and "cladding" or "clad" as used herein is intended to have such meaning. Satisfactory examples are aluminum, zirconium, zirconium alloys such as zircalloy (about 1.5% tin), and stainless steel, particularly the 300 series such as types 304 and 307. Other cladding materials which may be used are titanium, tungsten, magnesium and its alloys, and Inconel or other nickel-chromium alloys. Since the cladding has serrations or fins, aluminum is preferred as the cladding because it can be easily extruded, cast, or pressed into the desired fin shape, and also because of its low thermal neutron absorption cross section, low cost, and general ease of working.

Four aluminum extrusions are required (two for each fuel ring), smooth on the side adjacent to the fuel and finned on the other. The aluminum or other cladding can be easily metallurgically bonded to the tubular fuel core by such means as hot pressing. To prevent diffusion between the uranium metal or alloy core and aluminum cladding, when such is used, which might result in undesirable formation of $UAl_3$, a thin layer (e.g., 5 mils), of a diffusion barrier such as nickel may be electroplated or chemically deposited onto the uranium. The aluminum extrusion is then fitted over the uranium tube and hot pressed to form a metallurgical bond. In an alternate method, aluminum may be electroplated onto the uranium, or a smooth aluminum tube fitted around the cladding, and the fins imparted therein by hot pressing with a serrated die which at the same time forms the metallurgical bond. In any event, fabrication is found to be relatively easy by a number of different methods, none of which is critical.

The following table is offered by way of illustration rather than restriction as an example of my invention. Typical dimensions of a satisfactory fuel element are given as well as the design parameters of an organic moderated reactor in which it is employed. It should be understood, however, that these numbers are not critical, and that my fuel element can be used in other organic moderated reactor designs, as well as with other coolant media such as water, since the same considerations are present.

*Table*

(1) Reactor:
- Reactor power _____ 45.5 Mwt.
- Average thermal neutron flux in fuel _____ $1.4 \times 10^{13}$ n/cm.²-sec.
- Maximum thermal neutron flux in fuel _____ $4.5 \times 10^{13}$ n/cm.²-sec.
- Peak-to-average flux ratios—
  - Radial _____ 1.60.
  - Axial _____ 1.53.
- $U^{235}$ inventory _____ 118 kg.
- Core geometry _____ Right circular cylinder.
- Core L/D ratio _____ 1.23.
- Core diameter _____ 60 in.
- Effective multiplication constant (hot, clean) _____ 1.06.
- Temperature coefficient of reactivity (total at 550° F.) _____ $-5.7 \times 10^{-5}$/° F.
- Average burnup per fuel element _____ 325 Mwd.
- Core composition—
  - Coolant-moderator (terphenyl) _____ 67.7 vol. percent.
  - Uranium alloy _____ 17.5 vol. percent.
  - Aluminum _____ 12.3 vol. percent.
  - Stainless steel _____ 2.5 vol. percent.
- Excess reactivity (total, hot, clean) _____ 5.1%.
  - Cold to hot _____ 1.4%.
  - Equilibrium (Xe+Sm) _ 3.1%.
  - Burnup allowance _____ 1.0%.
  - Control margin _____ 1.0%.

(2) Fuel elements:
- Type _____ Concentric tubes.
- Number _____ 78.
- Tubes per element _____ 2.
- Cladding material and thickness _____ 0.035-in. finned alumin-

| | |
|---|---|
| Element outside diameter | 5.25 in. |
| Element inside diameter | 3.10 in. |
| Thickness of fuel Tube | 0.208 in. |
| Fuel can material and thickness | 0.030-in. stain. steel. |
| Fuel alloy | 3.5 w./o. Mo—U alloy. |
| Uranium-235 enrichment | 1.8%. |
| Active length of fuel element | 54 in. |
| Total length of fuel element | 73.8 in. |
| (3) Control elements: | |
| Configuration | Cylinders. |
| Number | 7. |
| Total worth (6 rods on 16-in. radius plus one central rod) | 10%. |
| Rod diameter | 5 in. |
| Active length | 48 in. |
| Rod travel (above bottom of active core) | 48 in. |
| Withdrawal rate (maximum) | 0.175 in./sec. |
| Control material | $B^{10}$. |
| Control rod composition | Boron steel or $B_4C$. |
| (4) Heat transfer: | |
| Coolant | Terphenyl. |
| Number of loops | 2. |
| Total flow rate | 12,000 g.p.m. ($5.5 \times 10^6$ lb./hr.). |
| Reactor inlet temperature | 523° F. |
| Reactor outlet temperature | 575° F. |
| Average coolant temperature rise in core (full power) | 52° F. |
| Coolant system design pressure | 300 p.s.i.a. |
| Nominal operating pressure (inlet to core tank) | 120 p.s.i.a. |
| Coolant velocity through fuel element (maximum) | 14.6 ft./sec. |
| Average heat flux in the core | 34,300 B.t.u./hr.-ft.$^2$. |
| Maximum heat flux in the core | 158,000 B.t.u./hr.-ft.$^2$. |
| Pressure drop through core | 31.2 p.s.i. |
| Heat transfer coefficient | 1,180 B.t.u./hr.-ft.$^2$-° F. |
| (5) Reactor core tank: | |
| Design pressure | 300 p.s.i.a. |
| Overall length | 26 ft. 8 in. |
| Outside diameter | 6 ft. 10 in. |
| Inside diameter | 6 ft. 6 in. |
| Thickness | 2 in. |
| Material | SA-212/carbon steel. |
| (6) Reactor thermal shield: | |
| Material | SA-212/carbon steel. |
| Inner shield thickness | 1.5 in. |
| Outer shield thickness | 4.25 in. |
| (7) Reactor biological shield: | |
| Material | Ordinary concrete. |
| Thickness | 7.75 ft. |
| (8) Reactor coolant systems: | |
| Main coolant pump capacity (one in each loop) | 6,000 g.p.m. (each). |
| Pressurizing pump flow rate (normal) | 200 g.p.m. |
| Purification flow rate (maximum) | 195 lb./hr. |
| Coolant makeup rate (full power) | 58 lb./hr. |
| Charging pumps' capacity (2) | 10 g.p.m. (total). |
| Volume of coolant in the system | 10,500 gal. (total). |
| Volume of coolant in each main coolant loop | 2,000 gal. |
| (9) Steam generators: | |
| Coolant flow to each steam generator | $2.75 \times 10^6$ lb./hr. |
| Coolant temperature entering superheater | 575° F. |
| Coolant temperature drop in superheater | 3° F. |
| Coolant temperature entering boiler | 572° F. |
| Coolant temperature drop in boiler | 49° F. |
| Coolant temperature leaving boiler | 523° F. |
| Feedwater temperature entering boiler | 268° F. |
| Steam pressure in boiler | 450 p.s.i.a. (saturated steam). |
| Steam temperature leaving superheater | 550° F. |
| Steam flow leaving each generator | 75,000 lb./hr. |
| Heat duty for the boiler | $72.5 \times 10^6$ B.t.u./hr. |
| Heat duty for superheater | $5.0 \times 10^6$ B.t.u./hr. |

Having thus described my invention, I claim:

1. A fuel element for a nuclear reactor comprising inner and outer container tubes, a plurality of spaced, concentric fuel tubes positioned between said container tubes, each of said fuel tubes comprising a core of fissionable material with cladding on the sides thereof, each of said sides having a plurality of fins, said fuel tubes and said container tubes defining annular spaces for coolant flow, and said inner container tube defining a channel for a reactor moderator.

2. The fuel element of claim 1 wherein said fins have a helical twist thereto.

3. A fuel element for a nuclear reactor comprising an inner and an outer concentric container tube, a plurality of spaced, concentric fuel tubes positioned between said container tubes, each said fuel tube comprising a core of fissionable material with cladding on the sides thereof, each of said sides having a plurality of fins, and means for maintaining the concentricity of said fuel tubes, said fuel tubes and said container tubes defining annular passages for coolant flow, said inner container tube defining a channel for a reactor moderator.

4. The fuel elements of claim 3 wherein said fins are disposed along the longitudinal axis of each said fuel tube and have a helical twist.

5. A fuel element for a nuclear reactor comprising an inner and an outer concentric, cylindrical container, two concentric fuel cylinders positioned between said containers, each said fuel cylinder comprising a core of fissionable material with cladding on the sides thereof, each of said sides having fins integral with said cladding and disposed along the longitudinal axis of said fuel cylinders, said fins having a helical twist, the twist of adjacent fins of said fuel cylinders being in opposite directions, said fins of said succeeding fuel cylinders contacting and crossing one another, thereby providing support for said cylinders and maintaining the concentricity thereof, said container cylinders and said fuel cylinders defining a plurality of annular passages therebetween for coolant flow, and said innner container cylinder defining a channel for moderator flow.

References Cited in the file of this patent

UNITED STATES PATENTS 2,885,335    Moore et al. _____ May 5, 1959

OTHER REFERENCES

Nucleonics II, June 1955, vol. 13, No. 6, page 93.
Nucleonics I, November 1956, vol. 14, No. 11, pages 138–144.
NAA–SR–1998, Nov. 15, 1957, in particular page 30.